US012335551B1

(12) United States Patent
Li et al.

(10) Patent No.: US 12,335,551 B1
(45) Date of Patent: Jun. 17, 2025

(54) METHOD AND SYSTEM FOR VIDEO STREAMING WITH CELLULAR DATA RATE PREDICTION

(71) Applicant: GM Global Technology Operations LLC, Detroit, MI (US)

(72) Inventors: Chuan Li, Troy, MI (US); Fan Bai, Ann Arbor, MI (US); Sheng Liu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 18/543,169

(22) Filed: Dec. 18, 2023

(51) Int. Cl.
  *H04N 21/2662* (2011.01)
  *H04N 21/24* (2011.01)
  *H04N 21/442* (2011.01)
  *H04N 21/61* (2011.01)

(52) U.S. Cl.
  CPC ..... *H04N 21/2662* (2013.01); *H04N 21/2402* (2013.01); *H04N 21/44209* (2013.01); *H04N 21/6181* (2013.01)

(58) Field of Classification Search
  CPC ........... H04N 21/2662; H04N 21/2402; H04N 21/44209; H04N 21/6181
  See application file for complete search history.

(56) References Cited

U.S. PATENT DOCUMENTS

| | | | | |
|---|---|---|---|---|
| 2014/0226711 A1* | 8/2014 | Ramamoorthy | ....... | H04N 19/40 375/240.02 |
| 2015/0201225 A1 | 7/2015 | Yin | | |
| 2016/0234078 A1* | 8/2016 | Jana | ......................... | H04L 47/25 |
| 2018/0132010 A1 | 5/2018 | Fu et al. | | |
| 2019/0104306 A1* | 4/2019 | Wang | ............. | H04N 21/234309 |
| 2021/0021878 A1* | 1/2021 | Fryer | ................. | H04N 21/2343 |
| 2022/0303331 A1 | 9/2022 | Svennebring et al. | | |

OTHER PUBLICATIONS

Petrangeli et al., "Dynamic video bitrate adaptation for WebRTC-based remote teaching applications," NOMS 2018—2018 IEEE/IFIP Network Operations and Management Symposium, Taipei, Taiwan, 2018, pp. 1-5, doi: 10.1109/NOMS.2018.8406217.

Uitto, et al., SAND-Assisted Encoding Control for Energy-Aware MPEG-DASH Live Streaming, 2016 24th International Conference on Software, Telecommunications and Computer Networks (SoftCOM), Split, Croatia, 2016, pp. 1-5, doi: 10.1109/SOFTCOM.2016.7772179.

\* cited by examiner

*Primary Examiner* — Mulugeta Mengesha
(74) *Attorney, Agent, or Firm* — Vivacqua Crane, PLLC

(57) ABSTRACT

A method for video streaming includes receiving a video service request from a vehicle. The video service request is indicative of a request for a video content. The method further includes receiving a bandwidth prediction of a cellular network from the vehicle, and a list of available video codec configurations for a video content associated with the video service request. Moreover, method includes determining a selected video codec configuration based on the bandwidth prediction of the vehicle, determining that the selected video codec configuration is part of the list of available video codec configurations, and providing the video content to the vehicle using the selected video codec configuration.

20 Claims, 1 Drawing Sheet

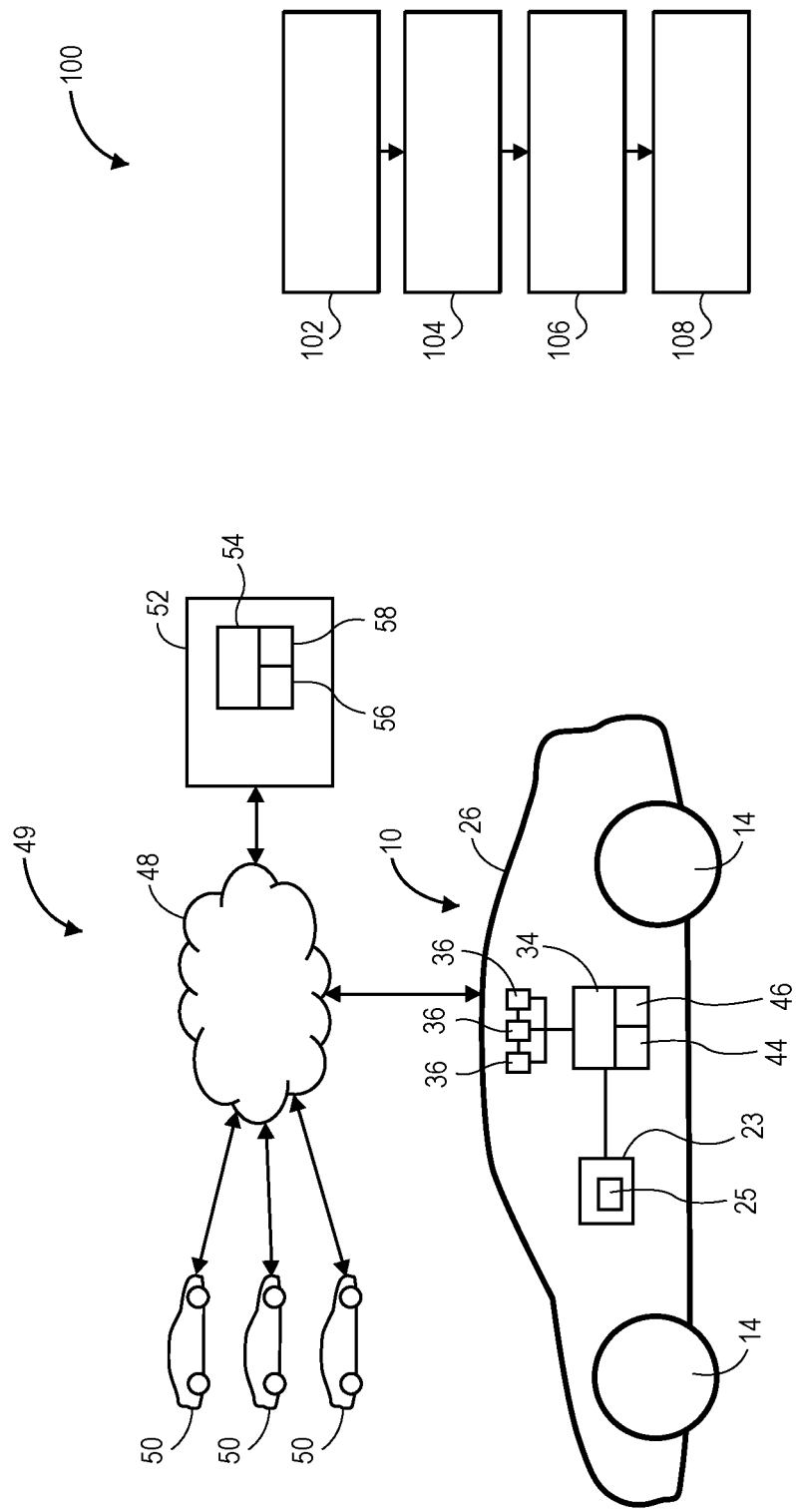

METHOD AND SYSTEM FOR VIDEO STREAMING WITH CELLULAR DATA RATE PREDICTION

INTRODUCTION

The present disclosure relates to a system and method for video streaming with cellular data rate prediction.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Cloud-based video streaming service transcode original video content into multiple versions with different qualities to serve lower quality video to clients with inferior connectivity. However, the decision to transcode the original video content to all possible versions can waste computational resources and may cause additional, albeit unnecessary, traffic among data center networks. This issue is most noticeable with live video streaming. It is therefore desirable to develop a method and system to deliver video content in a codec with appropriate parameters that is appropriate to the cellular connectivity.

SUMMARY

The present disclosure describes a method for delivering video content appropriate to the cellular connectivity. This method leverages data rate prediction on vehicle and algorithms run on remote servers (e.g., cloud systems) to intelligently select the best video codec and video quality combination to properly serve vehicle operators. The method includes receiving, by a remote server, a video service request from a vehicle. The video service request is indicative of a request for a video content. The method also includes receiving, by the remote server, a bandwidth prediction of a cellular network from the vehicle. The method also includes receiving, by the remote server, a list of available video codec configurations for a video content associated with the video service request. The method also includes determining a selected video codec configuration based on the bandwidth prediction of the vehicle. The method also includes determining that the selected video codec configuration is part of list of available video codec configurations. The method also includes providing the video content to the vehicle using the selected video codec configuration in response to determining that the selected video codec configuration is part of list of available video codec configurations. Other embodiments of this aspect include corresponding computer systems, apparatus, and computer programs recorded on one or more computer storage devices, each configured to perform the actions of the methods.

In certain aspects of the present disclosure, the method may additionally include determining that a bandwidth of the vehicle will decrease based on the bandwidth prediction of the vehicle received from the vehicle. The method further includes providing the video content to the vehicle using the selected video codec configuration in response to determining that the bandwidth of the vehicle will decrease. The method may include determining that a bandwidth of the vehicle will decrease based on the bandwidth prediction of the vehicle received from the vehicle and determining that the selected video codec configuration is not part of list of available video codec configurations in response to determining that the bandwidth of the vehicle will decrease. The method further includes determining another video codec configuration. The second video codec configuration is less efficient than the selected video codec configuration. The method further includes providing the video content to the vehicle using the second video codec configuration.

The method may include determining that a bandwidth of the vehicle will increase based on the bandwidth prediction of the vehicle received from the vehicle and receiving a video-codec-configuration change request from the vehicle in response to determining that the bandwidth of the vehicle will increase based on the bandwidth prediction of the vehicle received from the vehicle. The method may include determining a client resilience score in response to receiving a video-codec-configuration change request from the vehicle. The video-codec-configuration change request includes quality of service (QoS) metrics. The method further includes ranking the plurality of vehicles by the QoS metrics of the video codec configuration change. The method may include ranking the plurality of vehicles by resource consumption of the video codec configuration change. The method may include determining a reference signal received power (RSRP) of a plurality of signals received from the plurality of vehicles over time. The method may include selecting an optimal video codec configuration for each of the plurality of vehicles using the ranking the plurality of vehicles by the QoS metrics of the video-codec-configuration change request and the ranking the plurality of vehicles by resource consumption of the of the video codec configuration change.

The method may include determining that the RSRP of the plurality of signals received from the plurality of vehicles is decreasing over time. Further, the method includes predicting the video-codec-configuration change requests from the plurality of vehicles based on the RSRP in response to determining that the RSRP of the plurality of signals received from the plurality of vehicles is decreasing over time. Implementations of the described techniques may include hardware, a method or process, or computer software on a computer-accessible medium.

The present disclosure further describes a system for video streaming. The vehicle includes sensors and a remote server. The remote server is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 1 is a schematic diagram of a vehicle including a system for video streaming.

FIG. 2 is a flowchart of a method for video streaming.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a body 12 and a plurality of wheels 14 coupled to the body 12. The host vehicle 10 may be an autonomous vehicle. In the depicted embodiment, the host vehicle 10 is depicted in the illustrated embodiment as a sedan, but it should be appreciated that other vehicles including trucks, coupes, sport utility vehicles (SUVs), recreational vehicles (RVs), etc., may also be used.

The host vehicle 10 includes a vehicle controller 34 having at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the host vehicle 10. The vehicle controller 34 of the host vehicle 10 may be programmed to execute part or the entirety of the method 100 (FIG. 2) as described in detail below.

The instructions may include one or more separate programs, each of which comprises an ordered listing of executable instructions for implementing logical functions. The instructions, when executed by the vehicle processor 44, receive and process signals from sensors, perform logic, calculations, methods and/or algorithms for automatically controlling the components of the host vehicle 10, and generate control signals to automatically control the components of the host vehicle 10 based on the logic, calculations, methods, and/or algorithms. Although a single vehicle controller 34 is shown in FIG. 1, embodiments of the host vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the host vehicle 10. The vehicle controller 34 is part of a system 49 for video streaming with cellular data rate prediction.

The host vehicle 10 further includes one or more vehicle transceivers 36 in communication with the vehicle controller 34. Each of the vehicle transceivers 36 is configured to wirelessly communicate information to and from other entities using, for example, a cellular network 48. Accordingly, the host vehicle 10. As non-limiting examples, the vehicle transceivers 36 may transmit and/or receive information from other vehicles ("V2V" communication), infrastructure ("V2I" communication), remote systems at a remote call center (e.g., ON-STAR by GENERAL MOTORS) and/or personal electronic devices, such as a mobile phone. In certain embodiments, the vehicle transceivers 36 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The host vehicle 10 includes a user interface 23 in communication with the vehicle controller 34. The user interface 23 may be a touchscreen in the dashboard. The user interface 23 may include, but is not limited to, an alarm, such as one or more speakers to provide an audible sound, haptic feedback in a vehicle seat or other object, one or more displays 25, one or more microphones (e.g., a microphone array) and/or other devices suitable to provide a notification to the vehicle user of the host vehicle 10. The user interface 23 is in electronic communication with the vehicle controller 34 and is configured to receive inputs by a vehicle occupant (e.g., a vehicle operator or a vehicle passenger). For example, the user interface 23 may include a touch screen and/or buttons configured to receive inputs from a person. Accordingly, the controller 34 is configured to receive inputs from the user via the user interface 23.

One or more remote vehicles 50 may be in wireless communication with the cellular network 48. The remote vehicles 50 may be identical or substantially similar to the host vehicle 10. A remote server 52 (e.g., cloud server) may also be in wireless communication with the host vehicle 10 and the remote vehicles 50 through the cellular network 48.

The remote server 52 includes a server controller 54 having at least one vehicle processor 56 and a server non-transitory computer readable storage device or media 58. The vehicle processor 56 may be a custom made or commercially available processor, a central processing unit (CPU), a graphics processing unit (GPU), an auxiliary processor among several processors associated with the server controller 54, a semiconductor-based microprocessor (in the form of a microchip or chip set), a macroprocessor, a combination thereof, or generally a device for executing instructions. The server computer readable storage device or media 58 may include volatile and nonvolatile storage in read-only memory (ROM), random-access memory (RAM), and keep-alive memory (KAM), for example. KAM is a persistent or non-volatile memory that may be used to store various operating variables while the server processor 56 is powered down. The server computer-readable storage device or media 58 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the server controller 54 in controlling the host vehicle 10 and/or the remote vehicles 50. The server controller 54 may be programmed to execute part or the entirety of the method 100 (FIG. 2) as described in detail below. The remote server 54, the cellular network 48, the host vehicle 10, and the remote vehicles 50 are part of a system 49 for video streaming.

FIG. 2 is a flowchart of a method 100 for video streaming. The method 100 begins at block 102. At block 102, the remote server 52 may receive a video service request from the host vehicle 10 and/or the remote vehicles 50 through the cellular network 48. The video service request is indicative of a request for a particular video content from the remote server 54. In response, the remote server 52 (e.g., cloud server) sends the video content associated with the video service request to the host vehicle 10, the remote vehicle 50 and/or other clients. The host vehicle 10 and the remote vehicles 40 may be referred to as clients. Then, the method 100 continues to block 104.

At block 104, the clients (e.g., host vehicle 10 and/or remote server 52) predicts expected cellular bandwidth for a short period of time while the clients (e.g., host vehicle 10 and/or remote server 52) are receiving the video contents from a local data center (e.g., vehicle non-transitory computer readable storage device or media 46). The predicted expected bandwidth results are uploaded to the local data center (e.g., vehicle non-transitory computer readable storage device or media 46). The remote server 52 may receive these expected cellular bandwidth reports. U.S. patent application Ser. No. 18/494,189, filed on Oct. 25, 2023, which is herein incorporated by reference in its entirety, describes a method for predicting expected cellular bandwidth for a short period of time. Then, the method 100 continues to block 106.

At block 106, the vehicle controller 34 and/or the remote server 52 determines a video codec configuration (i.e., the selected video codec configuration) based, for example, on the cellular bandwidth prediction and a list of available video codec configurations for the video codec configurations for the video content associated with the vide service request. The vehicle controller 34 and/or the remote server 52 receive a list of available video codec configurations. Once the remote server 52 and/or the vehicle controller 34 decides on the video codec configuration, the method 100 continues to block 108.

At block 106, the vehicle controller 34 and/or the remote server 52 choose the video codec configuration that provides the best human perception quality with a bandwidth consumption no higher than the reported predicted bandwidth. To do so, the cellular communication data rate predictions are considered in deciding which video codec configuration should be used. Constrained by the predicted data rate on the client side (e.g., the vehicle side), the encoding and/or transcoding options are selected to deliver the best vide perception quality under the encoder resource constraints of the remote sever 52 (e.g., cloud-based system). This optimization problem may be expressed as follows:

$$\text{Maximize: } q = \text{Perception\_Quality } (S, b, t)$$

Subject to:

$$c \in \{x\}$$
$$r \leq \bar{r}$$
$$S = \text{Encode (param}_c\text{); and}$$
$$b = \text{BitRate } (S, t),$$

where:
t is a time interval in which we calculate short-term bitrate;
b is the short-term bitrate;
S is the video stream;
Param$_c$ are the encoding parameters of the selected codec c;
x is the codecs available on the remote server 52 (e.g., cloud-based system);
c is the selected codec;
r is the data rate; and
$\bar{r}$ is the expected data rate.

By defining the optimization problem as expressed below, the remote server 52 (e.g., cloud-based system) does not have to transcode for every video quality, only pre-cache videos to data centers from where videos are likely to be requested by the target vehicles (e.g., host vehicle 10 and/or remote vehicles 50), and the vehicles (e.g., host vehicle 10 and/or remote vehicles 50) receive the maximized video quality allowed by its cellular connectivity. The video content may be available in multiple video codec configurations or profiles. Each codec may be available in different video codec configurations or profiles. As non-limiting examples, each codec may be available in mostly static video configuration, normal video configuration, and highly dynamic video configuration. Each video codec configurations or profiles has a particular bitrate, quality, and codec resource rate.

The remote server 52 (e.g., cloud-based system) selects the most bandwidth efficient codecs to deliver the equal quality video chunks, making some codecs congested resources. When clients (e.g., the host vehicle 10 and/or the remote vehicles 50) are in situations that require congested codec resources to maintain certain QoS metrics, the system 49 accommodates such changes. Accordingly, system 49 uses the less efficient codecs with better cellular link quality, because the clients (e.g., the host vehicle 10 and/or the remote vehicles 50) can tolerate a bitrate increase. In one scenario, no relaxation of the vide codec configuration is required because the target video with the required quality is available. In another scenario, a design client resilient score is calculated when the target video with the required quality is unavailable. The following equations may be used to determine the design client resilient score:

$$\omega = \lambda d_{cm} + \beta\left(T - \frac{tv_1}{v_0}\right) + \gamma(\bar{r} - r)$$
$$\lambda + \beta + \gamma = 1$$

where:
d$_{cm}$ is the distance to high content miss rate geographic zone;
T is each video chunk's playback time;
t is the video chunk delivery time for previous video quality;
v$_1$ is the previous video chunk delivered, specifically, it denotes the size of the video chunk in size;
v$_1$ is the video chunk size with the planned quality;
$\bar{r}$ denotes the predicted estimated data rate
r is the data rate v1 uses; and
$\lambda$, $\beta$, and $\gamma$ are weight coefficients to combine the three terms into a resilient score.

A higher design client resilient score means a client (e.g., host vehicle 10 and/or remote vehicles 50) is less likely to experience a cellular connection quality drop. The search for relaxed codec usage is a global search. A video chunk with a certain quality may be used by multiple data centers. Only when all data centers determine that video codec configuration relaxation is possible, the data center originally producing the video content stops producing the video with that quality. The data centers may have many video streaming sessions simultaneously.

The search space reduction heuristics focus on clients (e.g., host vehicle 10 and/or remote vehicles 50) in urban or suburban areas due to better cellular coverage. Further, the search space reduction heuristics focus on clients (e.g., host vehicle 10 and/or remote vehicles 50) with lower mobility (e.g., non-freeway vehicles). These video codec configuration of clients with lower mobility tend to be valid for longer time. The search space reduction heuristics treat Wi-Fi and ethernets users as resilient users. The search space reduction heuristics takes hints from general data rage change trend.

The client resilience score in response to receiving a video-codec-configuration change request from the vehicle for all the clients (e.g., host vehicle 10 and/or remote vehicles 50) may be determined in response to receiving a video-codec-configuration change request from one or more clients. The system 49 identifies the services for codec relaxation decision. Given a certain number of services, the system 49 finds the maximum client resilience score across the video services.

The codec search problem considers the several resource availability concerns. First, the codec search problem considers the total data center egress bandwidth. Second, the codec search problem considers the codec resource usage (e.g., AV1 code usage percentage reaches 99%). The solution requirements for this codec search problem include that a minimum quality guarantee is needed for all clients and that the selected configuration should match the client cellular connection the best. The solution for the codec search problem entails ordering the profiled video codec configurations in decreasing order with respect to quality. Then, the system 49 solves a multi-dimensional 0/1 Knapsack problem, but with multiple capacities as constraints. Each codec resources in use should not reach a certain percentage threshold (e.g., 85%). The total bandwidth consumption should be below the data center's total egress bandwidth. Next, the system 49 searches for optimal solutions.

As discussed above, the codec search problem may be expressed as a knapsack problem. For this problem, the optimization goal is to maximize bandwidth usage. That is, the optimization goal is to minimize the remaining bandwidth as expressed below:

$$\sum_{k=1}^{N}(\Phi_0^k - \Phi_1^k),$$

N is the number of clients;
k is a client index;
$\Phi_0^k$ is the available bandwidth of the client k for video streaming; and
$\Phi_1^k$ is the bandwidth usage of the client k using a selected codec configuration.

The optimization goal has a number of constraints relating to codecs resource utilization rate and egress bandwidth constraint. These constraints may be expressed by the following equations:

$$\forall i \in M, \sum_{k=1}^{N} \rho_{i,j}^k \leq \rho_0$$

$$\sum_{k=1}^{N}\sum_{i=1}^{M}\sum_{j=1}^{Q}\Phi_{i,j}^k \leq \Phi$$

where:
$\rho_0$ is the predefined utilization rate threshold (e.g., 85%);
M denotes the codecs;
N denotes the clients;
j is the configuration;
i is a particular codec;
k is the client index;
$\rho_{i,j}^k$ is the codec resource utilization rate used by codec i with configuration j at client k;
Q is the total configurations; and
$\Phi_{i,j}^k$ is the egress bandwidth constraint at client k using codec i with configuration j at client k.

The optimal 0/1 Knapsack problem may not guarantee the desired per-client QoS metrics and it is expensive to solve. For this reason, the system 49 may implement pruning strategies. In the first pruning strategy, if the predetermined percentage (e.g., 90%) of a client's bandwidth budget is used, then the client is well served. In solving the 0/1 multi-dimensional Knapsack problem, if a configuration entails a bandwidth utilization that is less than a certain percentage, then the system 49 ignores such configuration. This strategy has some implications. First, if the client requests quality improvement, the low bandwidth usage configurations will be ignored. Second, if the client requests bandwidth reduction, high bandwidth usage configurations will be ignored.

In the pruning second strategy, if two clients in the same video service have similar network connectivity, the configuration accommodation only considers one of them. In the third pruning strategy, if a first client requests a configuration change and a second client in the same video service uses reasonably good configuration, the heuristics algorithm starts with the second client's configuration, because the second client's configuration incurs in no cost.

For each client, system 49 summarizes certain information among the feasible configurations. First, the system 49 determines the minimum bandwidth required. Second, the system 49 determines the codec utilization required for each of the available codecs. Third, the system 49 changes can be accommodated with guaranteed QoS metrics if the required minimum resource is greater than what the data center has to offer.

The heuristic algorithm includes the following steps. First, the system 49 ranks clients (e.g., the host vehicle 10 and/or the remote vehicles 50) in descending order by their QoS request. Then, the system 49 ranks per-client configurations in descending order by resource consumption. Next, for each client, the system 49 selects a configuration that satisfies the minimum resource budget constraint. When the configurations are selected, the system 49 always makes sure that the minimum bandwidth requirement is not violated. Then, the system 49 uses a wave expansion strategy for more expensive configurations.

The system 49 may also use the Reference Signal Received Power (RSRP) of a plurality of signals received from clients (e.g., host vehicle 10 and/or remote vehicles 50) over time to predict the video-codec-configuration change requests from the clients. There is a high correlation between the RSRP and the data throughput. In accommodating video-codec-configuration changes, searching for candidates for configuration relaxion may be expensive. If the RSRP trend indicates that the data rate will increase, the vehicle controller 34 (i.e., the vehicle client) may let the remote server 52 (e.g., cloud-based system) know that the configuration may be relaxed. If the RSRP trend indicates that the data rate will keep dropping, the system 49 informs the remote server 52 of potential change of configuration requests.

In a vehicle scenario, while the host vehicle 10 is receiving video contents from a local data center (e.g., in the vehicle non-transitory computer readable storage device or media 46), the system 49 predicts the expected cellular bandwidth for a short period of time. The predicted expected bandwidth results are uploaded to the remote server 52 or the local data center.

If the bandwidth is expected to decrease, the remote server 52 pre-calculates for video reconfiguration. The new video configuration is stored in the system 49. Once the host vehicle 10 experiences quality of service issues, the host vehicle 10 notifies the remote server 52 by uploading the current bandwidth a client current bandwidth module. This module will then work a video configuration controller to select an appropriate video configuration for the host vehicle 10. The pre-calculated video configurations contain a valid video configuration for the host vehicle 10, the remote server 52 can directly use it. If the pre-calculated video configuration is not available, the remote server 52 calculates, in real-time, a new video configuration. When calculating the video configuration for the host vehicle 10, the remote server 52 leverages a set of remote vehicles 50 that report themselves as relaxable and also the set or running services. The rule is that the resources used to produce the current serving content for a service can be relaxed when all the clients of a service agree on the video configuration relaxation. If the local data center does not have the video with the selected video configuration, the vehicle 10 can request the remote server 50 to produce it. Notably, the remote server 50 does not have to wait until the host vehicle 10 reports that is experiencing quality of service issues before taking action. The remote server 52 may take actions even before the host vehicle 10 reports bandwidth to trigger video reconfiguration. This unique capability is enabled by cellular bandwidth prediction.

When the host vehicle 10 expects its bandwidth to increase, the host vehicle 10 has two choices. First, the host vehicle 10 may notify the remote server 52 that the video configuration may be relaxed. That is, the less efficient video compression configurations may be used without hurting the user's perceivable experience. Second, if the host vehicle 10 is currently streaming low-quality content, the host vehicle 10 may submit a video configuration change request and ask the remote server 52 to deliver higher quality video. If the host vehicle 10 notifies the remote server 52 that the video configuration can be relaxed, then such information may be stored as relaxable vehicle clients. This vehicle status is transient. Once the vehicle's expected bandwidth decreases, the host vehicle 10 should be removed from the relaxable vehicle clients list.

The system 49 also includes a video processing resource scheduling process that is performed during the pre-calculation of the video reconfiguration and during the real-time video configuration calculation. As a result, upon receiving a video reconfiguration request from the host vehicle 10, the remote server 52 produces video configurations that maximizes the quality of experience without violating the resource constraints in the cloud data centers. In this scheduling algorithm, if the remote server 52 determines that the processing resources are abundant, the remote server 52 will query an offline knowledge database for available configurations without executing the scheduling algorithm.

At block 108, the vehicle controller 34 and/or remote server 52 provides the video content associated with the videos service request to the host vehicle 10 and/or the remote vehicles 50 using the select video codec configuration. Specifically, the video content is provided to the user interface 23. As a result, the display 25 of the user interface 23 shows the video content. If the video content in the selected video codec configuration is not available locally (e.g., in the vehicle non-transitory computer readable storage device or media 46), then the remote server 52 produces the video content with the selected video codec configuration. Then, the remote server 52 sends the videos (or video chunks) to the vehicle's local data center (e.g., vehicle non-transitory computer readable storage device or media 46).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for video streaming, comprising:
   receiving, by a remote server, a video service request from a vehicle, wherein the video service request is indicative of a request for a video content;
   receiving, by the remote server, a bandwidth prediction of the vehicle from the vehicle;
   receiving, by the remote server, a list of available video codec configurations for a video content associated with the video service request;
   determining a selected video codec configuration based on the bandwidth prediction of the vehicle;
   determining that the selected video codec configuration is part of the list of available video codec configurations; and
   in response to determining that the selected video codec configuration is part of the list of available video codec configurations, providing the video content to the vehicle using the selected video codec configuration.

2. The method of claim 1, further comprising:
   determining that a bandwidth of the vehicle will decrease based on the bandwidth prediction of the vehicle received from the vehicle; and
   in response to determining that the bandwidth of the vehicle will decrease, providing the video content to the vehicle using the selected video codec configuration.

3. The method of claim 1, further comprising:
   determining that a bandwidth of the vehicle will decrease based on the bandwidth prediction of the vehicle received from the vehicle;
   in response to determining that the bandwidth of the vehicle will decrease, determining that the selected video codec configuration is not part of list of available video codec configurations; and
   determining another video codec configuration.

4. The method of claim 1, further comprising:
   determining that a bandwidth of the vehicle will increase based on the bandwidth prediction of the vehicle received from the vehicle;
   in response to determining that the bandwidth of the vehicle will increase based on the bandwidth prediction of the vehicle received from the vehicle, selecting a second video codec configuration, wherein the second video codec configuration is less efficient than the selected video codec configuration; and
   providing the video content to the vehicle using the second video codec configuration.

5. The method of claim 1, further comprising:
   determining that a bandwidth of the vehicle will increase based on the bandwidth prediction of the vehicle received from the vehicle; and
   in response to determining that the bandwidth of the vehicle will increase based on the bandwidth prediction of the vehicle received from the vehicle, receiving a video-codec-configuration change request from the vehicle.

6. The method of claim 5, further comprising determining a client resilience score in response to receiving a video-codec-configuration change request from the vehicle.

7. The method of claim 6, wherein the vehicle is a first vehicle of a plurality of vehicles, the video-codec-configuration change request includes quality of service (QoS) metrics, and the method further includes ranking the plurality of vehicles by the QoS metrics of the video codec configuration change.

8. The method of claim 7, further comprising ranking the plurality of vehicles by resource consumption of the of the video codec configuration change.

9. The method of claim 7, further comprising selecting an optimal video codec configuration for each of the plurality of vehicles using the ranking the plurality of vehicles by the QoS metrics of the video-codec-configuration change request and the ranking the plurality of vehicles by resource consumption of the of the video codec configuration change.

10. The method of claim 8, further comprising determining a Reference Signal Received Power (RSRP) of a plurality of signals received from the plurality of vehicles over time.

11. The method of claim 9, further comprising:
    determining that the RSRP of the plurality of signals received from the plurality of vehicles is decreasing over time; and
    in response to determining that the RSRP of the plurality of signals received from the plurality of vehicles is decreasing over time, predicting the video-codec-configuration change requests from the plurality of vehicles based on the RSRP.

12. A system for video streaming:
    a remote server in communication with a vehicle, wherein the remote server is programmed to:
    receive a video service request from the vehicle, wherein the video service request is indicative of a request for a video content;
    receive a bandwidth prediction of a cellular network from the vehicle;

receive a list of available video codec configurations for a video content associated with the video service request;

determine a selected video codec configuration based on the bandwidth prediction of the vehicle;

determine that the selected video codec configuration is part of list of available video codec configurations; and in response to determining that the selected video codec configuration is part of list of available video codec configurations, provide the video content to the vehicle using the selected video codec configuration.

13. The system of claim 12, wherein the remote server is programmed to:

determine that a bandwidth of the vehicle will decrease based on the bandwidth prediction of the vehicle received from the vehicle; and in response to determining that the bandwidth of the vehicle will decrease, provide the video content to the vehicle using the selected video codec configuration.

14. The system of claim 12, wherein the remote server is programmed to:

determine that a bandwidth of the vehicle will decrease based on the bandwidth prediction of the vehicle received from the vehicle;

in response to determining that the bandwidth of the vehicle will decrease, determine that the selected video codec configuration is not part of list of available video codec configurations; and determine another video codec configuration.

15. The system of claim 12, wherein the remote server is programmed to:

determine that a bandwidth of the vehicle will increase based on the bandwidth prediction of the vehicle received from the vehicle;

in response to determining that the bandwidth of the vehicle will increase based on the bandwidth prediction of the vehicle received from the vehicle, select a second video codec configuration, wherein the second video codec configuration is less efficient than the selected video codec configuration; and providing the video content to the vehicle using the second video codec configuration.

16. The system of claim 12, wherein the remote server is programmed to:

determine that a bandwidth of the vehicle will increase based on the bandwidth prediction of the vehicle received from the vehicle; and in response to determining that the bandwidth of the vehicle will increase based on the bandwidth prediction of the vehicle received from the vehicle, receive a video-codec-configuration change request from the vehicle.

17. The system of claim 16, wherein the remote server is programmed to determine a client resilience score in response to receiving a video-codec-configuration change request from the vehicle.

18. The system of claim 17, wherein the vehicle is a first vehicle of a plurality of vehicles, the video-codec-configuration change request includes quality of service (QoS) metrics, and wherein the remote server is programmed to rank the plurality of vehicles by the QoS metrics of the video codec configuration change.

19. The system of claim 18, wherein the remote server is programmed to rank the plurality of vehicles by resource consumption of the of the video codec configuration change.

20. The system of claim 19, wherein the remote server is programmed to select an optimal video codec configuration for each of the plurality of vehicles using the ranking the plurality of vehicles by the QoS metrics of the video-codec-configuration change request and the ranking the plurality of vehicles by resource consumption of the of the video codec configuration change.

\* \* \* \* \*